United States Patent [19]
Hayashi et al.

[11] Patent Number: 4,827,721
[45] Date of Patent: May 9, 1989

[54] HYDROSTATIC CONTINUOUSLY VARIABLE TRANSMISSION

[75] Inventors: Tsutomu Hayashi; Mitsuru Saito; Takushi Matsuto; Yoshihiro Nakajima, all of Tokyo; Kenji Sakakibara, Saitama; Nobuyuki Yakigaya, Chiba; Kazuhiko Nakamura, Kanagawa, all of Japan

[73] Assignee: Honda Giken Kogyo Kabushiki Kaisha, Tokyo, Japan

[21] Appl. No.: 112,329

[22] Filed: Oct. 22, 1987

[30] Foreign Application Priority Data

Oct. 29, 1986 [JP] Japan .................................. 61-257496
Dec. 1, 1986 [JP] Japan .................................. 61-286131
Dec. 1, 1986 [JP] Japan .................................. 61-286132

[51] Int. Cl.$^4$ .............................................. F16D 39/00
[52] U.S. Cl. ......................................... 60/489; 60/487
[58] Field of Search ................. 91/480, 481, 482, 483; 60/487, 488, 489

[56] References Cited

U.S. PATENT DOCUMENTS

| | | |
|---|---|---|
| 2,546,583 | 3/1951 | Born et al. ............................ 91/482 |
| 2,844,002 | 7/1958 | Pavesi ................................. 60/487 X |
| 3,161,023 | 12/1964 | Margolin . |
| 3,165,892 | 1/1965 | Roberts . |
| 3,175,363 | 3/1965 | Molly . |
| 3,190,232 | 6/1965 | Budzich ............................. 91/482 X |
| 3,362,342 | 1/1968 | Flint et al. ............................ 91/482 |
| 3,890,883 | 6/1975 | Rometsch . |
| 4,735,050 | 4/1988 | Hayashi et al. ........................ 60/489 |
| 4,741,251 | 5/1988 | Hayashi et al. ................... 91/506 X |
| 4,745,748 | 5/1988 | Hayashi et al. ........................ 60/489 |
| 4,748,898 | 6/1988 | Hayashi . |

FOREIGN PATENT DOCUMENTS 0186500 7/1986 European Pat. Off. .
61-153057 4/1986 Japan .
62-167970 7/1987 Japan .

OTHER PUBLICATIONS

G. Niemann, "Maschinenelemente," 1983, pp. 68, 82 & 83.

Primary Examiner—Edward K. Look
Attorney, Agent, or Firm—Lyon & Lyon

[57] ABSTRACT

In a hydrostatic continuously variable transmission comprising a swashplate type hydraulic pump having a pump swashplate and annularly arranged pump plungers whose suction and discharge strokes are provided by the pump swashplate, a swashplate type hydraulic motor having a motor swashplate and annularly arranged motor plungers whose expansion and shrinkage strokes are provided by the motor swashplate, and a hydraulic closed circuit formed between the hydraulic pump and motor, the middle point of a discharge region of the hydraulic pump is angularly delayed at a given angle in a direction of rotation of the hydraulic pump relative to a tilting axis of the pump swashplate, and/or the middle point of an expansion region of the hydraulic motor is angularly advanced at a given angle in a direction of rotation of the hydraulic motor relative to a tilting axis of the motor swashplate. Further, a suction region of the hydraulic pump is set at an angle larger than that of a discharge region thereof, and/or a shrinkage region of the hydraulic motor is set at an angle larger than that of an expansion region thereof.

40 Claims, 15 Drawing Sheets

FIG.12
FIG.11
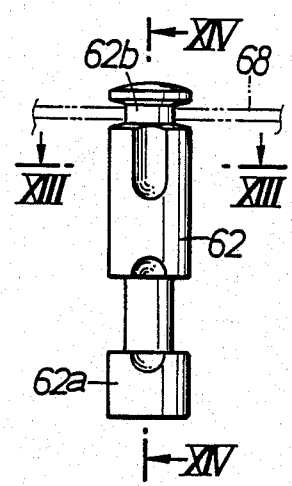
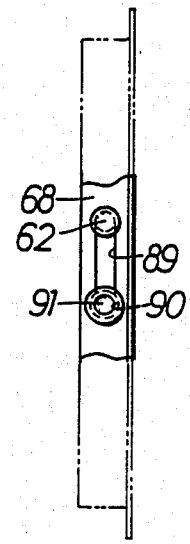
FIG.13  FIG.14
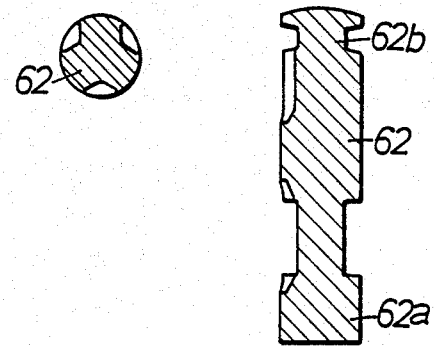

HYDROSTATIC CONTINUOUSLY VARIABLE TRANSMISSION

BACKGROUND OF THE INVENTION

1. Field of the Invention

The present invention relates to a hydrostatic continuously variable transmission comprising a swashplate type hydraulic pump having a pump swashplate and annularly arranged pump plungers whose suction and discharge strokes are provided by the pump swashplate, a swashplate type hydraulic motor having a motor swashplate and annularly arranged motor plungers whose expansion and shrinkage strokes are provided by the motor swashplate, and a hydraulic closed circuit formed between these hydraulic pump and motor.

2. Description of the Prior Art

Hydrostatic continuously variable transmission are already known, for example, as disclosed in Japanese patent application Laid-open No. 153057/86. In the conventional hydrostatic continuously variable transmission, the middle point of a discharge region of the hydraulic pump is aligned with a tilting axis of the pump swashplate in a rotational direction of the hydraulic pump and the middle point of an expansion region of the hydraulic motor is aligned with a tilting axis of the motor swashplate in a rotational direction of the hydraulic motor. Therefore, the pump plungers and the motor plungers receive angled compression loads from the pump and motor swashplates at their substantially most projected positions, respectively and thus receive large bending moments due to lateral components of such loads, therefor. This is one of the causes for increasing frictional loss of the plungers.

Further, the present inventors have made clear that the back pressures of the hydraulic pump and the hydraulic motor are obstacles to an improvement of transmitting efficiency and have made efforts that a passage resistance in the hydraulic closed circuit is reduced to decrease such back pressures, but has reached a certain limit for the reasons of insurance of a pressure resistance in an oil passage defining portion and of compactification and have not led to the accomplishment of the intended purpose.

SUMMARY OF THE INVENTION

With the foregoing in view, it is an object of the present invention to provide a hydrostatic continuously variable transmission of which operation can be performed at an extremely good efficiency over a long period of time without bringing about a complication in structure and an increase in size.

To achieve the above object, according to the present invention, there is provided a hydrostatic continuously variable transmission comprising a swashplate type hydraulic pump having a pump swashplate and annularly arranged pump plungers whose suction and discharge strokes are provided by the pump swashplate, a swashplate type hydraulic motor having a motor swashplate and annularly arranged motor plungers whose expansion aand shrinkage strokes are provided by the motor swashplate, and a hydraulic closed circuit formed between these hydraulic pump and motor, wherein the hydrostatic continuously variable transmission has at least one of a relationship that a middle point of a discharge region of the hydraulic pump is angularly delayed at a given angle in a direction of rotation of the hydraulic pump relative to a tilting axis of the pump swashplate and a relationship that a middle point of an expansion region of the hydraulic motor is angularly advanced at a given angle in a direction of rotation of the hydraulic motor relative to a tilting axis of the motor swashplate.

Due to angularly delayed setting of the middle point of the discharge region of the hydraulic pump at a given angle in the direction of rotation of the hydraulic pump relative to the tilting axis of the pump swashplate, as described above, the pump plunger starts to receive a compression load from the pump swashplate from the instant when it has been shrinked at a certain amount past a most projected point and therefore, a largest bending moment produced in the pump plunger is reduced.

In addition, due to angularly advanced setting of the middle point of the expansion region of the hydraulic motor at a given angle in the direction of rotation of the hydraulic motor relative to the tilting axis of the motor swashplate, the motor plunger is early released from a thrust reaction of the motor swashplate before reaching a most projected point and therefore, a largest moment produced in the motor plunger is also reduced.

Further, according to the present invention, there is provided a hydrostatic continuously variable transmission comprising a swashplate type hydraulic pump having a pump swashplate and annularly arranged pump plungers whose suction and discharge strokes are provided by the pump swashplate, a swashplate type hydraulic motor having a motor swashplate and annularly arranged motor plungers whose expansion and shrinkage strokes are provided by the motor swashplate, and a hydraulic closed circuit formed between these hydraulic pump and motor, wherein the hydrostatic continuously variable transmission has at least one of a relationship that a suction region of the hydraulic pump is set at an angle larger than that of a discharge region thereof and a relationship that a shrinkage region of the hydraulic motor is set at an angle larger than that of an expansion region thereof.

With such construction, setting the pump suction region at an angle larger than that of the discharge region makes it possible to sufficiently reduce the back pressure of a pump plunger which is in the suction stroke and consequently, the total pumping efficiency can be improved, even if the discharge region is sacrified to some degree.

Additionally, in the hydraulic motor, setting its shrinkage region at an angle larger than that of the expansion region makes it posible to sufficiently reduce the back pressure of a motor plunger which is in the shrinkage stroke and consequently, the total motor efficiency can be improved, even if the expansion region is sacrificed to certain degree.

Accordingly, it is unnecessary to vary the passage resistance in the hydraulic closed circuit in order to reduce the back pressures of the hydraulic pump and the hydraulic motor. This makes it possible to provide an improvement in transmission efficiency, while meeting the requirements in the pressure resistance of an oil passage defining portion and compactness of structure.

The above and other objects, features and advantages of the invention will become apparent from reading of the following detailed description of several preferred embodiments taken in conjunction with the accompanying drawings.

BRIEF DESCRIPTION OF THE DRAWINGS

FIGS. 1 to 18 illustrate a first embodiment of the present invention, wherein

FIG. 1 is a plan view in longitudinal section of a hydrostatic continuously variable transmission incorporated in a power transmitting system of a motorcycle;

FIG. 2 is a back view in longitudinal section, similar to FIG. 1;

FIGS. 3, 4, and 5 are sectional views taken along lines III—III, IV—IV and V—V in FIG. 2, respectively;

FIG. 6 is a sectional view taken along a line VI—VI in FIG. 1;

FIG. 7 is a sectional view taken along a line VII—VII in FIG. 6;

FIG. 8 is a sectional view taken along a line VIII—VIII in FIG. 1;

FIG. 9 is a sectional view (in a clutch OFF condition) taken along a line IX—IX in FIG. 1;

FIG. 10 is an operation view (in a clutch ON condition), similar to FIG. 9;

FIG. 11 is a view taken in a direction indicated by an arrow XI in FIG. 9;

FIG. 12 is a front view of the second distributor valve;

FIGS. 13 and 14 are sectional views taken along lines XIII—XIII and XIV—XIV in FIG. 12, respectively;

FIG. 15 is an enlarged view of a part of FIG. 2;

FIG. 16 is a sectional view taken along a line XVI—XVI in FIG. 15;

FIG. 17 is a sectional view taken along a line XVII—XVII in FIG. 2; and

FIG. 18 is a view taken in a direction indicated by an arrow XVIII in FIG. 2; and FIGS. 19 to 21 illustrate a second embodiment of the present invention, wherein FIG. 19 is a sectional view similar to FIG. 10;

FIG. 20 is a front view of a second distributor valve; and

FIG. 21 is a sectional view taken along a line XXI—XXI in FIG. 20.

DESCRIPTION OF THE PREFERRED EMBODIMENTS

Figure 1:
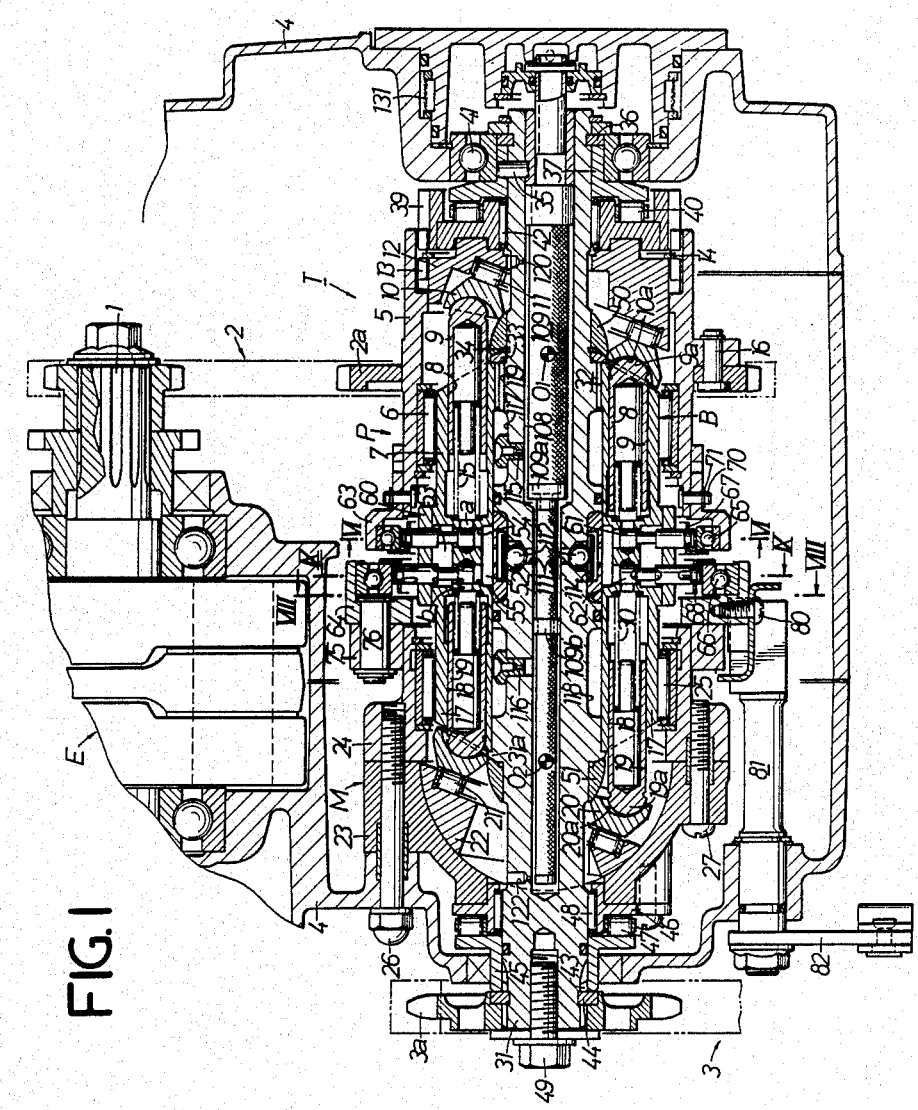
Figure 2:
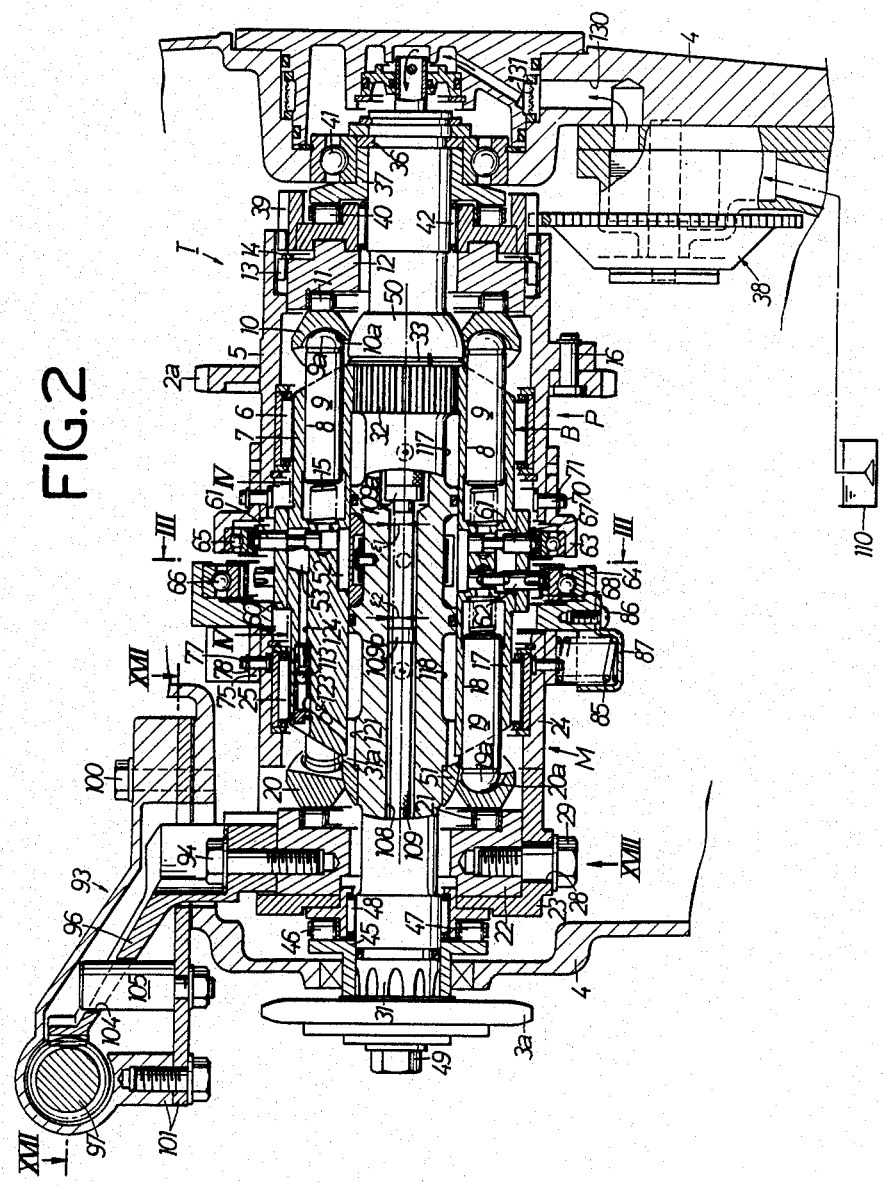
Figure 3:
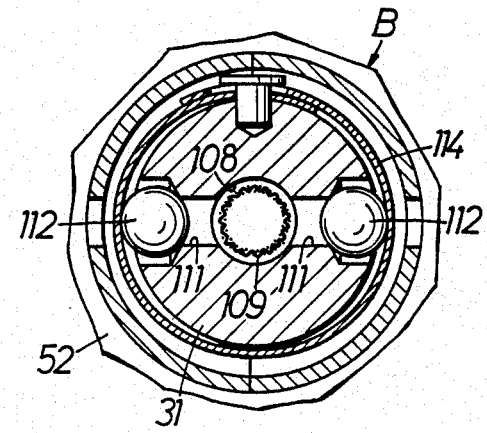

The present invention will now be described by way of embodiments with reference to the accompanying drawings. Referring first to FIGS. 1 and 2, a power from an engine E of a motorcycle is transmitted from a crank shaft 1 of the engine E via a chain type primary reduction device 2, a hydrostatic continuously variable transmission T and a chain type secondary reduction device 3 successively to a rear wheel which is not shown.

The continuously variable transmission T comprises a constant capacity swashplate type hydraulic pump P and a variable capacity swashplate type hydraulic motor M and is contained within a casing provided by a crank case 4 which carries the crank shaft 1.

The hydraulic pump P comprises a cylindrical input shaft 5 to which an output sprocket 2a of the primary reduction device 2 is detachably connected by a plurality of connecting pins 16 (only one shown in the drawings), a pump cylinder 7 relatively rotatably fitted to a central inner peripheral wall of the cylindrical input shaft 5 through a needle bearing 6, a large number of pump plungers 9, 9 - - - slidably received in a plurality and odd-number of annularly arranged cylinder bores 8, 8 - - - provided in the pump cylinder 7 to surround a rotational center of the latter, and a pump swashplate 10 abutting against outer ends of the pump plungers 9, 9 - - - , and a pump swashplate holder 12 for supporting a back surface of the swashplate 10 through a thrust roller bearing 11 to hold the swashplate 10 in an attitude inclined about a phantom trunnion axis $O_1$ (i.e., a tilting axis of the pump swashplate 10) laid normal to an axis of the pump cylinder 7, by a predetermined angle with respect to the axis of the pump cylinder 7. The pump swashplate holder 12 is releasably spline-fitted at 13 to an inner peripheral wall at an outer end of the input shaft 5 and temporarily fastened by a Cir-clip 14.

The pump swashplate 10 enables the pump plungers 9, 9 - - - to be reciprocally moved during rotation of the input shaft 5 to repeat suction and discharge strokes.

It is to be noted that a coiled spring 15 for biasing the pump plunger 9 to expand may be mounted in compression in the cylinder bore 8 in order to improve the ability of the pump plunger to follow the pump swashplate 10.

On the other hand, the hydraulic motor M comprises a motor cylinder 17 coaxially disposed leftward from the pump cylinder 7, a large number of motor plungers 19, 19 - - - slidably received in a plurality and odd-number of annularly arranged cylinder bores 18, 18 - - - provided in the motor cylinder 17 to surround a rotational center of the latter, a motor swashplate 20 abutting against outer ends of the motor plungers 19, 19 - - , a trunnion shaft 22 semicircular in section for supporting a back surface of the motor swashplate 20 on a flat surface thereof through a thrust roller bearing 21, and a swashplate anchor 23 for rotatably supporting a cylindrical surface of the trunnion shaft 2 with no clearance therebetween. The swashplate anchor 23 is secured to the crank case 4 by a bolt 26 along with a cylindrical cylinder holder 24 connected to a right end of the swashplate anchor 23. The cylinder holder 24 supports an outer periphery of the motor cylinder 17 through a needle bearing 25 for rotation.

By supporting the cylindrical surface of the trunnion shaft 22 on the swashplate anchor 23 without gaps therebetween for rotation as described above, it is possible to enhance a supporting rigidity for the trunnion shaft 22 and to effectively prevent deflection of the trunnion shaft 22 due to a thrust load from the motor plungers 19, 19 - - - .

It should be noted that the swashplate anchor 23 and the cylinder holder 24 have been connected to each other by a bolt 27 prior to assembling into the transmission T.

Figure 18:
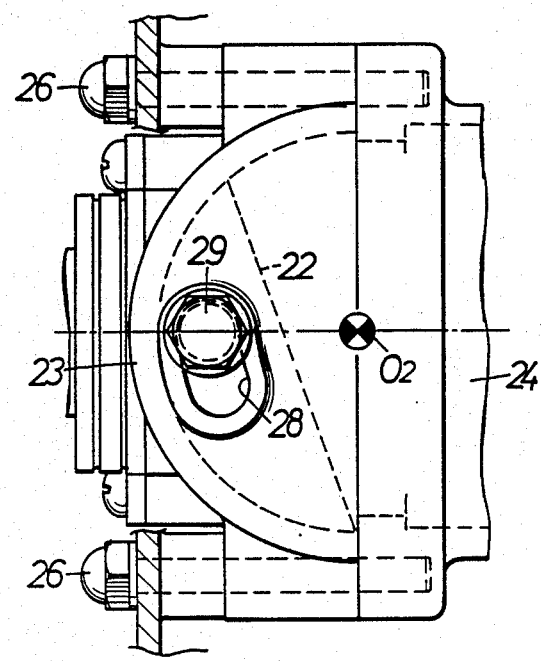

To permit the rotation of the trunnion shaft 22 through a predetermined angle and block the axial movement of the trunnion shaft 22, a bolt 29 is secured to one end face of the trunnion shaft 22 through a circular arc-shaped elongated hole 28 having a center provided by an axis $O_2$ (i.e., a tilting axis of the motor swashplate 20) of the trunnion shaft 22 (see FIGS. 2 and 18).

The motor swashplate 20 is operated by the rotation of the trunnion shaft 22 between a standing position in which it is located perpendicularly to the axis of the motor cylinder 17 and a maximum tilted position in which it is tilted down at a certain angle, and when in the tilted position, the motor swashplate 20 enables the motor plungers 19, 19 - - - to be reciprocally moved with the rotation of the motor cylinder 17 to repeat expansion and shrinkage strokes.

It should be noted that a coiled spring 30 for biasing the motor plunger 19 to expand may be mounted in compression in the cylinder bore 18 in order to improve the ability of the motor plunger 19 to follow the motor swashplate 20.

The pump cylinder 7 and the motor cylinder 17 constitute an integral cylinder block B, and an output shaft 31 as a transmission shaft is passed through a central portion of the cylinder block B. The motor cylinder 17 is located with its outer end abutted against a flange 31a integrally formed on an outer periphery of the output shaft 31, while the pump cylinder 7 is spline-fitted at 32 to the output shaft 31, and a Cir-clip 34 is locked on the output shaft 31 to abut against an outer end of the pump cylinder 7 through a seat plate 33, whereby the cylinder block B is secured to the output shaft 31.

A right end of the output shaft 31 extends through the pump swashplate 10, the pump swashplate holder 12 and a right wall of the crank case 4, aand a drive gear 39 for a supplement pump 38 which will be described hereinafter and a thrust roller bearing 40 are interposed in order from the pump swashplate holder 12 between the latter and a support sleeve 37 secured to an outer periphery of such right end of the shaft 31 by a knock pin 35 and a split cotter 36. The output shaft 31 is rotatably supported at its right end on the crank case 4 through the support sleeve 37 and a ball bearing 41.

The drive gear 39 is spline-fitted to the cylindrical input shaft 5 in the same manner as with the pump swashplate holder 12, and is rotatably supported on the output shaft 31 through a needle bearing 42.

In addition, a left end of the output shaft 31 extends through the trunnion shaft 22, the swashplate anchor 23 and a left hand wall of the crank case 4, and a retainer 46 and a thrust roller bearing 47 are interposed in order from the swashplate anchor 23 between the latter and a support sleeve 45 spline-connected at 43 to an outer periphery of such left end of the shaft 31 and secured by a split cotter 44. The output shaft 31 is also rotatably supported at its left end on the swashplate anchor 23 through a needle bearing 48 and the retainer 46. Thus, a radial component of thrust load applied from the motor plungers 19, 19 - - - to the motor swashplate 20 can be transmitted to and supported by the output shaft 31, and this makes it possible to reduce a load to be borne by the crank case 4 serving as a casing.

Further, an input sprocket 3a of the secondary reduction device 3 is secured to the left end of the output shaft 31 outside the crank case 4.

In this manner, all components of the transmission T including the sprocket 2a and the sprocket 3a are integrated into a single assembly on the output shaft 31 and hence, mounting and dismounting the transmission T to and from the crank case 4 can be extremely easily achieved.

Slidably fitted over the output shaft 31 are a semispherical aligning member 50 adapted to engage the inner perihperal surface of the pump swashplate 10 for relative tilting movement in all directions and a semispherical aligning member 51 adapted to engage the inner peripheral surface of the motor swashplate 20 for relative tilting movement in all directions, these aligning members providing an aligning effect on the pump swashplate 10 and on the motor swashplate 20, respectively.

For the purpose of enhancing the aligning effect on each of the swashplates 10 and 20 and also preventing a slipping in the rotational direction between the pump swashplate 10 and the pump plungers 9, 9 - - - and between the motor swashplate 20 and the motor plungers 19, 19 - - -, spherical recesses 10a and 20a to be engaged by spherical ends 9a and 19a of the corresponding plungers 9 and 19 are defined in the swashplates 10 and 20, respectively.

A hydraulic closed circuit is formed between the hydraulic pump P and the hydraulic motor M in the following manner.

Between the cylinder bores 8, 8 - - - of the pump cylinder 7 and the motor cylinder bores 18, 18 - - - of the motor cylinder 17, the cylinder block B are provided with annular inner and outer oil passages 52 and 53 respectively serving as lower and higher pressure oil passages and concentrically arranged around the output shaft 31; first valve bores 54, 54 - - - and second valve bores 55, 55 - - - radially penetrating an anuular partition wall between both of the oil passages 52 and 53 and an outer peripheral wall of the outer oil passage 53 and provided in the same number respectively as the cylinder bores 8, 8 - - - and 18, 18 - - - ; a large number of pump ports a, a - - - permitting the intercommunication of the adjacent cylinder bores 8, 8 - - - and first valve bores 54, 54 - - - ; and a large number of motor ports b, b - - - permitting the intercommunication of the adjacent cylinder bores 18, 18 - - - and second valve bores 55, 55 - - - .

The inner oil passage 52 is defined in the form of a annular groove between the opposed peripheral surfaces of the cylinder block B and the output shaft 31.

Figure 4:
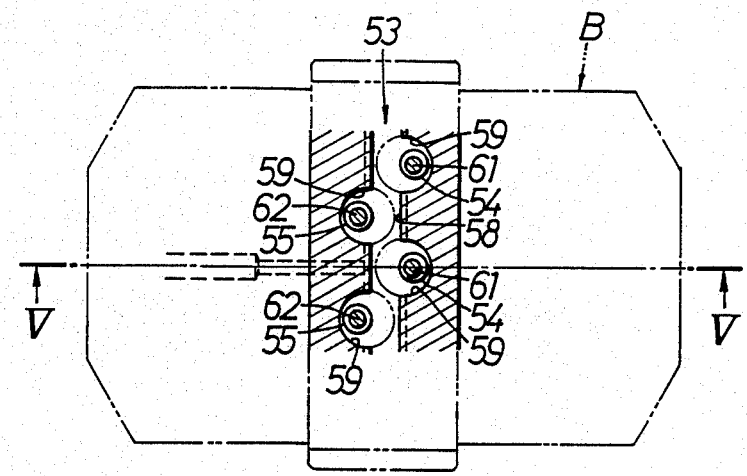
Figure 5:
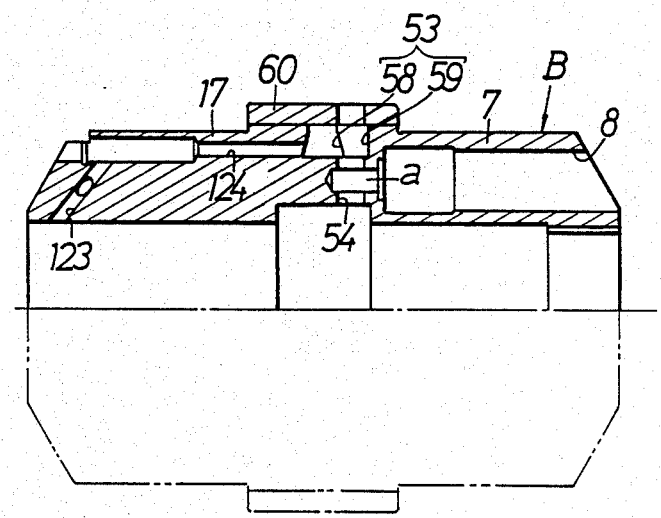

On the other hand, the outer oil passage 53 is constituted, as shown in FIGS. 4 and 5, of a pigeon's tailshaped annular groove 58 cut in the outer periphery of the cylinder block B and a plurality of semicircular recesses 59, 59 - - - made in a zigzag arrangement in opposite side walls of the pigeon's tail-shaped groove 58, with open surfaces of the pigeon's tail-shaped groove 58 and the recesses 59, 59 - - - being closed by a sleeve 60 welded to the outer peripheral surface of the cylinder block B. The outer oil passage 53 of such configuration is convenient in decreasing the volume of high pressure portion to the utmost, as compared with a higher pressure oil passage constituted of a simple annular groove in the prior art previously proposed (see Japanese patent application Laid-open No. 167970/87).

The first and second valve bores 54 and 55 are arranged to penetrate bottom walls of the recesses 59, 59 - - - made in a zigzag arrangement, and in correspondence to this, the cylinder bores 8, 8 - - - of the hydraulic pump P and the cylinder bores 18, 18 - - - of the hydraulic motor M are circumferentially offset in phases from each other.

If doing so, it is possible to decrease the distance between the first and second valve bores 54 and 55 in the axial direction of the cylinder block B, while increasing the wall thickness of the cylinder block B between the first and second valve bores 54 and 55, leading to a contribution to a compactification of the cylinder block B.

In addition, even if an enlarged deformation occurs in the opposite side walls of the pigeon's tail-shaped groove 58 when a higher hydraulic pressure has been introduced into the outer oil passage 53, the surface pressure at the fitted portion between the cylinder block B and the sleeve 60 is rather increased due to such deformation, which makes it possible to prevent a leakage of an oil from such fitted portion.

Spool type first distributor valves 61, 61 - - - are slidably received in the first valve bores 54, 54 - - -, and spool type second distributor valves 62, 62 - - - are slidably received in the second valve bores 55, 55 - - -, respectively. A first eccentric ring 63 is mounted to surround and engage outer ends of the first distributor valves 61, 61 - - - through ball bearings 65, while a second eccentric ring 64 is mounted to surround and engage outer ends of the second distributor valves 62, 62 - - - through ball bearings 66. In order to force these engagements, the first distributor valves 61, 61 - - - are interconnected at their outer ends by a first forcing ring 67 concentric with the first eccentric ring 63, while the second distributor valves 62, 62 - - - are interconnected at their outer ends by a second forcing ring 68 concentric with the second eccentric ring 64. These connected arrangements will be described below.

Figure 6:
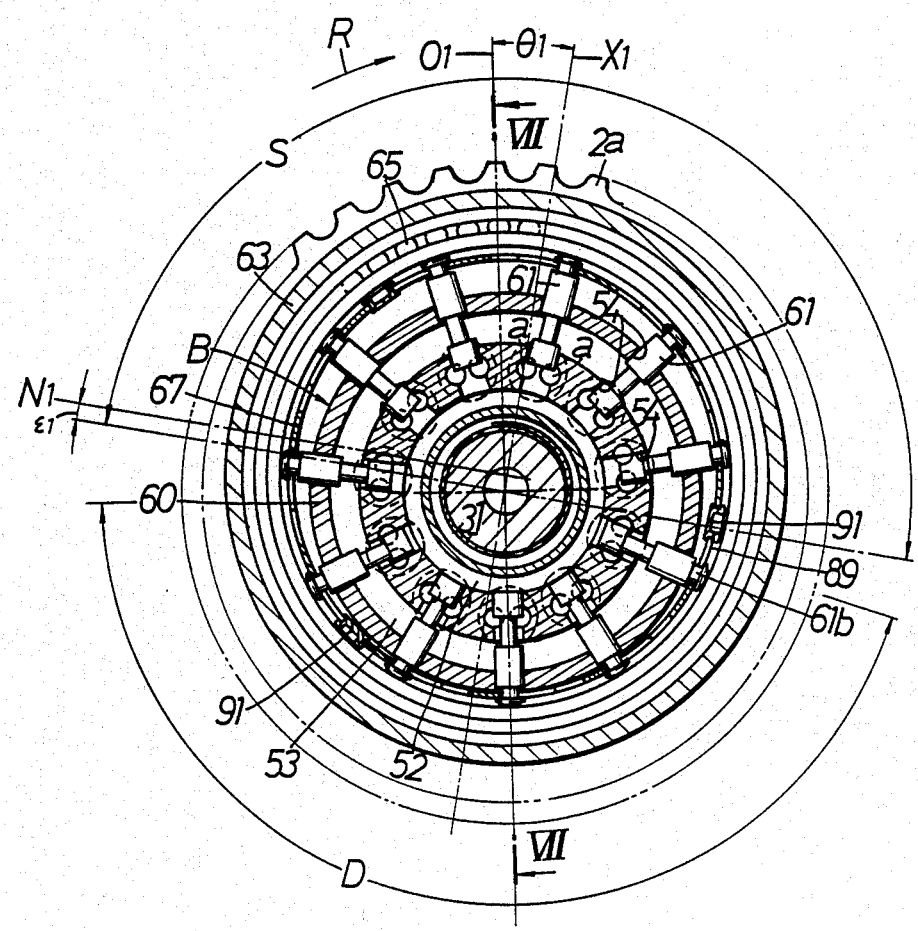

The first eccentric ring 63 is releasably secured to the outer periphery of the cylindrical input shaft 5 by a headed pin 70 and a clip 71 and held at a location eccentrically displaced a given distance $\epsilon_1$ from a center of the output shaft 31 along a line $X_1$ in an eccentric direction, as shown in FIG. 6. The line $X_1$ in the eccentric direction is established at a place angularly delayed at a given angle $\theta_1$ from the phantom trunnion axis $O_1$ of the pump swashplate 10 in a direction R of relative rotation of the pump cylinder 7 with respect to the cylindrical input shaft 5. The angle $\theta_1$ can be readily adjusted by shifting the place at which the input shaft 5 and the pump swashplate holder 12 are spline-fitted to each other. This makes it possible to adjust the phases relative to the pump swashplate 10 in discharge and suction regions of the hydraulic pump P and therefore to meet various required performances of the hydraulic pump without reproduction of components.

When a relative rotation occurs between the cylindrical input shaft 5 and the pump cylinder 7, the first eccentric ring 63 causes each of the first distributor valves 61 to be reciprocally moved in the first valve bore between radially inner and outer positions in the pump cylinder 7 with a stroke of a distance as long as two times an eccentric amount $\epsilon_1$.

In FIG. 6, the discharge region of the hydraulic pump P is designated by D, while the suction region is by S, and the line $X_1$ in the eccentric direction of the first distributor valve 61 passes a middle point of each of the regions D and S. In the discharge region D, the first distributor valve 61 is moved in the inner position from a location $N_1$ (which will be referred to as an eccentricity neutral location) to bring the corresponding pump port a into communication with the outer oil passage 53 and out of communication with the inner oil passage 52, so that the pump plunger 9 which is in its discharge stroke causes a working oil to be drawn from the inner oil passage 52 into the cylinder bore 8.

In the suction region S, the first distributor valve 61 is moving on the side of the radially outer position with respect to the neutral position $N_1$ thereby to place the corresponding pump port a in communication with the inner oil passage 52 and out of communication with the outer oil passage 53. With this, the pump plunger 9 in the suction stroke causes working oil to be sucked from the inner oil passage 52 into the cylinder bore 8.

Figure 6A:
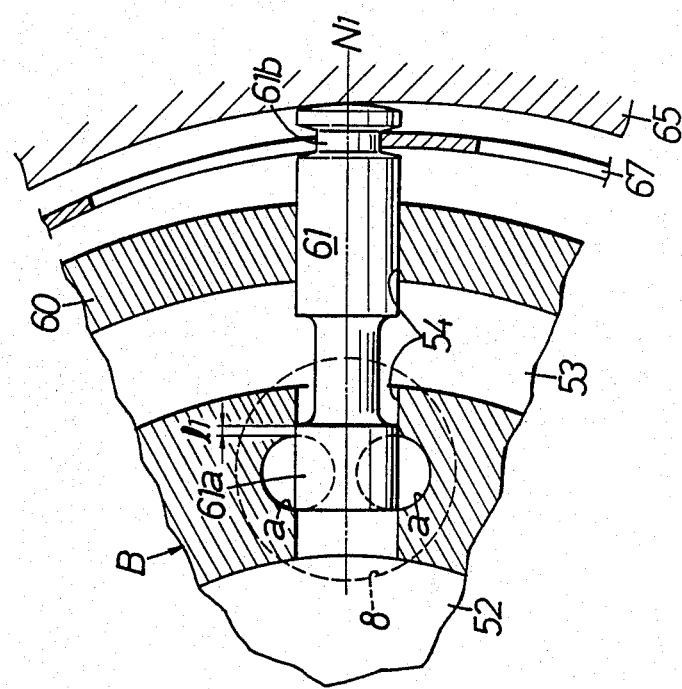
FIG. 6A is an enlarged sectional view of a first distributor valve brought into an eccentricity neutral position in FIG. 6 and a portion around the first distributor valve.

In the eccentricity neutral location $N_1$, the first distributor valve 61 puts the corresponding pump port a out of communication with both the oil passages 52 and 53. In this case, a valve-closing margin $l_1$ is provided on a land 61a of the first distributor valve 61, which closes the port a, only at its portion closer to the outer oil passage 53, as shown in FIG. 6A.

In this way, the discharge region D of the hydraulic pump P is angularly delayed by the angle $\theta_1$ as compared with the case where the line $X_1$ in the eccentric direction is aligned with the phantom trunnion axis $O_1$, and the suction region S can be set to have an angle larger than that of the discharge region D.

Figure 8:
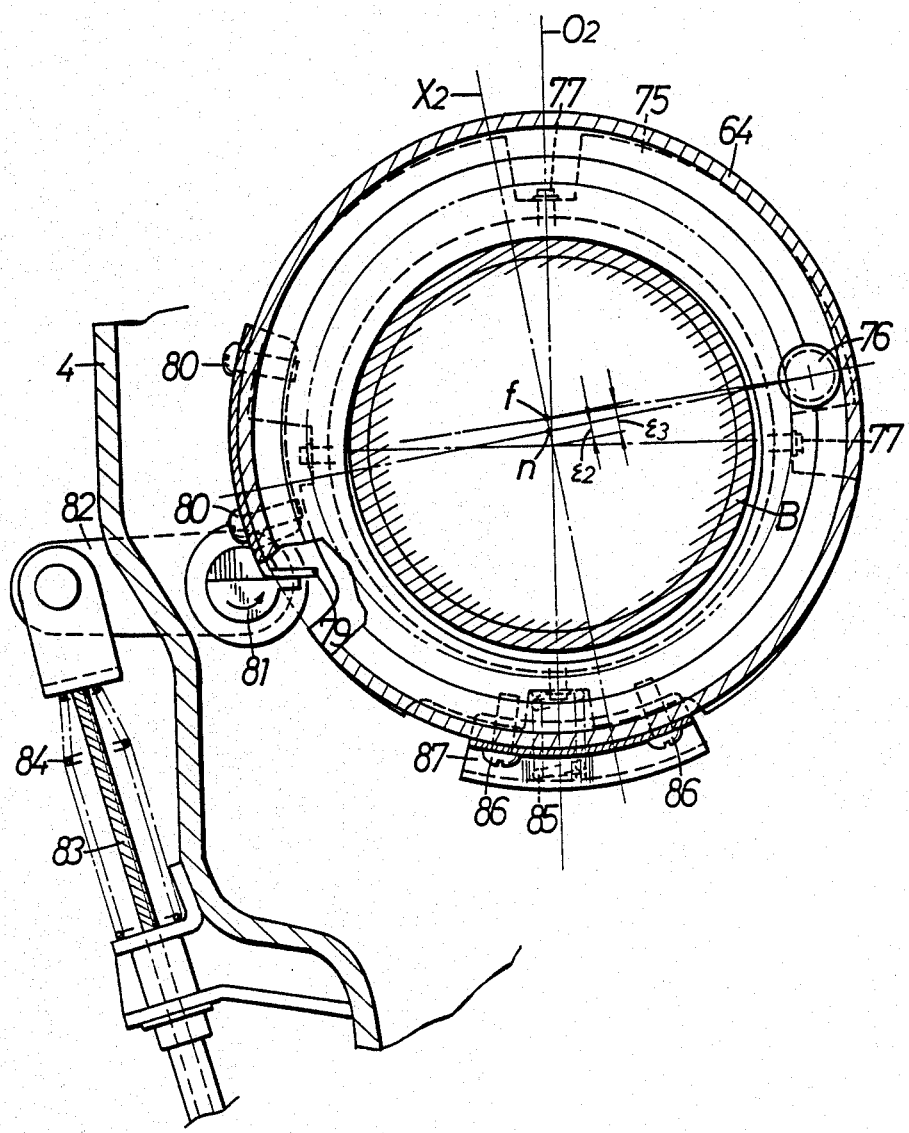

The second eccentric ring 64 is connected to a support ring 75 through a pivot 76 parallel to the output shaft 31 for swinging movement between a clutch ON position n and clutch OFF position f, as shown in FIGS. 1, 2 and 8. The support ring 75 is detachably secured to the outer periphery of the cylinder holder 24 through a plurality of headed pins 77 and a plurality of clips 78. Accordingly, it is possible to minimize any misalignment in phase between the trunnion axis $O_2$ of the swashplate 20 and a line $X_2$ in the eccentric direction of the second eccentric ring 64 and to fix the relationship between both of them prior to assembling to the crank case 4, because the cylinder holder 24 for supporting the second eccentric ring 64 is connected with the swashplate anchor 23 for supporting the swashplate 20 by the bolt 27.

Figure 9A:
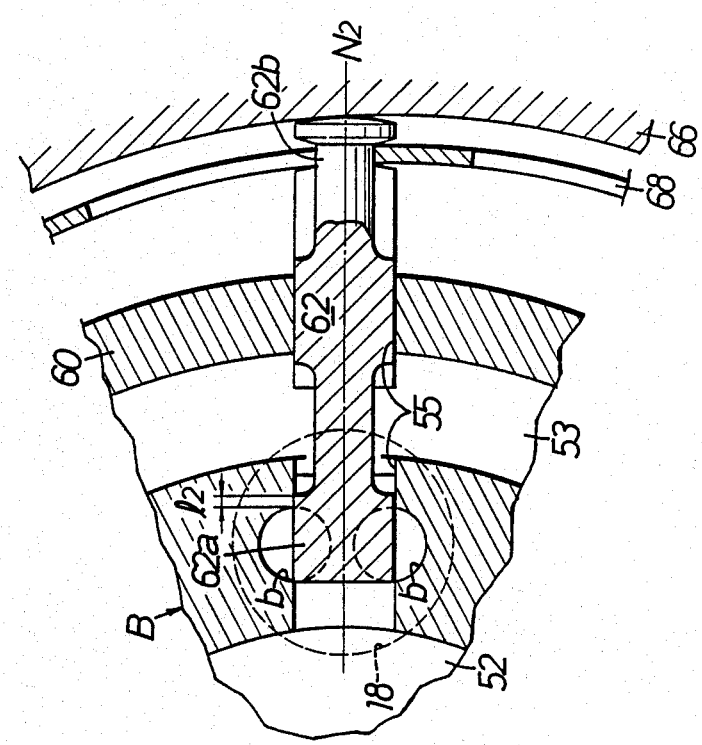
FIG. 9A is an enlarged sectional view of a second distributor valve brought into an eccentricity neutral position in FIG. 9 and a portion around the second distributor valve.
Figure 9:
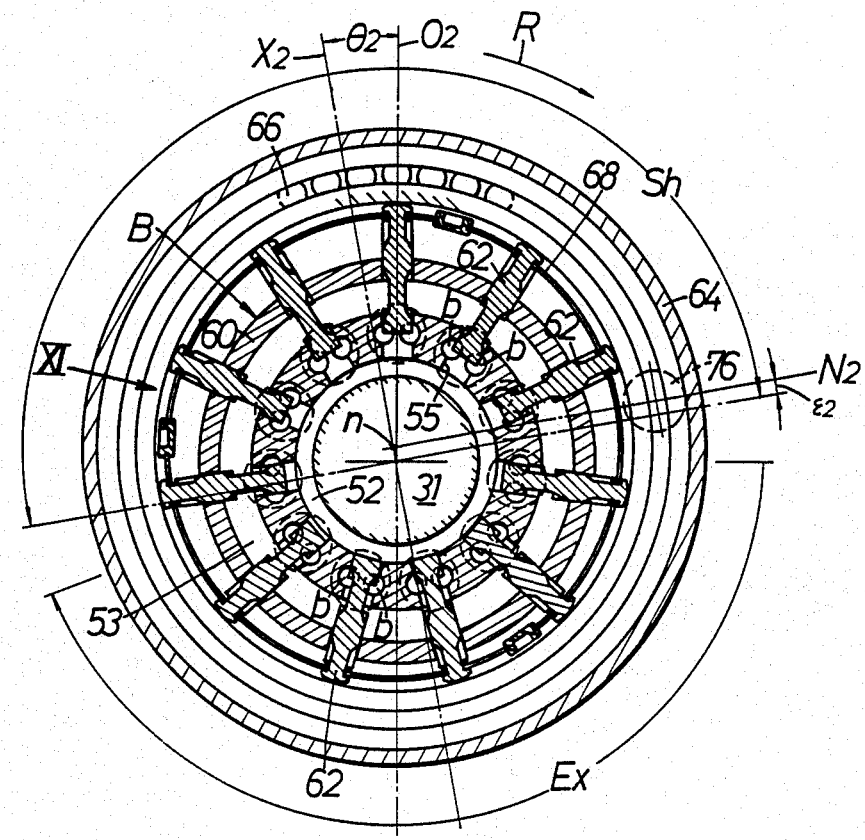
Figure 10:
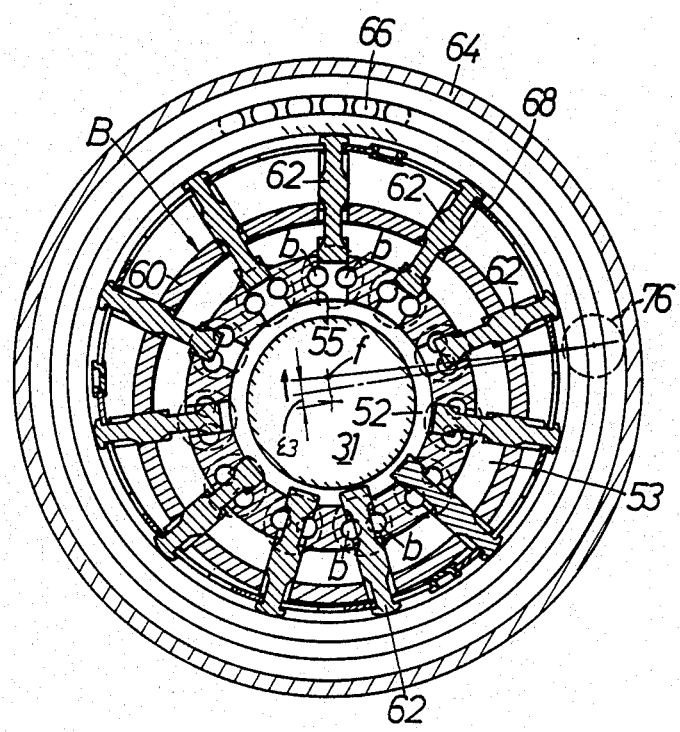

As shown in FIG. 9, the line $X_2$ in the eccentric direction of the second eccentric ring 64 is set at a place angularly advanced through a given angle $\theta_2$ from the trunnion axis $O_2$ in the direction R of rotation of the motor cylinder 17, and has an eccentric amount of $\epsilon_2$ in the clutch ON position n and an eccentric amount of $\epsilon_3$ larger than $\epsilon_2$ in the clutch OFF position f, as shown in FIG. 8.

When the second eccentric ring 64 assumes the clutch ON position n, the eccentric ring 64, upon rotation of the motor cylinder 17, causes each of the second distributor valves 62 to be reciprocally moved in the second valve bore 55 between the radially inner and outer positions in the motor cylinder 17 with a stroke of a distance two times the eccentric amount $\epsilon_2$.

In FIG. 9, an expansion region of the hydraulic motor M is designated by Ex, while a shrinkage region is by Sh, and the line $X_2$ in the eccentric direction of the second distributor valve 62 passes a middle point of each of the regions Ex and Sh. In the expansion region Ex, the second distributor valve 62 is moved in the inner position from an eccentricity neutral location $N_2$ to bring the corresponding motor port b into communication with the outer oil passage 53, while at the same time putting them out of communication with the inner oil passage 52, so that a higher pressure working oil is supplied from the outer oil passage 53 into the cylinder bore 18 of the motor plunger 19 which is in an expansion stroke.

In the shrinkage region Sh, the second distributor valve 62 is moved in the outer position from the eccentricity neutral location $N_2$ to bring the corresponding motor port b into communication with the inner oil passage 52, while at the same time putting them out of communication with the outer oil passage 53, so that the working oil is discharged out of the cylinder bore 18 of the motor plunger 19 in its shrinkage stroke into the inner oil passage 52.

In the eccentricity neutral location $N_2$, the second distributor valve 62 puts the corresponding port b out of communication with both of the oil passages 52 and 53. In this case, a given valve-closing margin $l_2$ is provided on a land 62a of the first distributor valve 62, which closes the port b, only at its portion closer to the outer oil passage 53, as shown in FIG. 9A.

In this way, the expansion region Ex of the hydraulic motor M is angularly advanced by the angle $\theta_2$ as compared with the case where the line $X_2$ in the eccentric direction is aligned with the trunnion axis $O_2$, and the shrinkage region Sh can be set to have an angle larger than that of the expansion region Ex.

When the second eccentric ring 64 assumes the clutch OFF position f, it causes each second distributor valves 62 upon the rotation of the motor cylinder 17 to be reciprocally moved in the second valve bore 55 between the radially inner and outer positions in the motor cylinder 17 with a stroke as long as two times the eccentric amount $\epsilon_3$. In the inner and outer positions, the second distributor valve 62 permits the outer oil passage 53 to be opened outside the cylinder block B. In this way, each second distributor valve 62 also has a function as a clutch valve and this leads to a simplified and compact structure of the transmission as a whole when compared with the prior art in which an exclusive clutch valve is separately mounted.

A pair of the aforesaid pump ports a are provided side by side in a direction perpendicular to a direction of sliding movement of the first distributor valve 61 for every one cylinder bore 8. A pair of the aforesaid motor ports b are also provided side by side in a direction perpendicular to a direction of sliding movement of the second distributor valve 62 for every one cylinder bore 18. If doing so, each distributor valve 61, 62 enables opening and closing of the corresponding port a, b with a relatively short stroke thereof, while insuring a larger total passage area of the pump ports a and the motor pump ports b.

Returning to FIG. 8, an abutment plate 79 is secured to the second eccentric ring 64 at its peripheral wall on the opposite side from the pivot 76 thereof by a machine screw 80, and a cam shaft 81 is mounted in engagement with the abutment plate 79 to cam the latter toward the clutch OFF position f of the second eccentric ring 64. An operating wire 83 is connected to a clutch lever 82 secured to an outer end of the cam shaft 81, and a spring 84 for returning the clutch lever 82 is mounted in compression between the clutch lever 82 and the crank case 4. The second eccentric ring 64 is also biased by a setting spring 85 toward the clutch ON position n. The setting spring 85 is mounted in compression between a retainer 87 secured to the outer periphery of the second eccentric ring 64 by a machine screw 86 and the support ring 75.

Thus, the second eccentric ring 64 is normally held at the clutch ON position n by the force of setting spring 85, but is swung to the clutch OFF position f as the cam shaft 81 is turned as indicated by an arrow by drawing of the operating wire 83.

With the above construction, when the cylindrical input shaft 5 of the hydraulic pump P is rotated through the primary reduction device 2 with the second eccentric ring 64 remaining held at the clutch ON position N, the pump swashplate 20 causes the discharge and suction strokes to be alternately provided to the pump plungers 9, 9 - - - .

Thus, the pump plunger 9 pumps a working oil from the cylinder bore 8 into the outer oil passage 53 during passing through the discharge region D, and draws the working oil from the inner oil passage into the cylinder bore 8 during passing through the suction region S.

The high pressure working oil pumped into the outer oil passage 53 is supplied into the cylinder bore 18 of the motor plunger 19 located in the expansion region Ex of the hydraulic motor M, on the one hand and is discharged from the cylinder bore 18 into the inner oil passage 52 by the motor plunger 19 located in the shrinkage region Sh, on the other hand.

During this time, the cylinder block B is rotated by the sum of a reaction torque received by the pump cylinder 7 from the pump swashplate 10 through the pump plungers which are in the discharge stroke and a reaction torque received by the motor cylinder 17 from the motor swashplate 20 through the motor plunger 19 which are in the expansion stroke, and the rotational torque of the cylinder block B is transmitted from the output shaft 31 to the secondary reduction device 3.

In this case, a shift ratio of the output shaft 31 to the cylindrical input shaft 5 is given by the following equation:

$$\text{Shift ratio} = 1 + \frac{\text{Capacity of the hydraulic motor } M}{\text{Capacity of the hydraulic pump } P}$$

Therefore, if the capacity of the hydraulic motor M is changed from 1 to a certain value, the shift ratio can be changed from 1 to a certain required value. Because the capacity of the hydraulic motor M is determined by the stroke of the motor plunger 19, the shift ratio can be controlled in a continuously variable manner from 1 to a certain value by providing the tilting movement of the motor swashplate 20 from the standing position to a certain tilted position.

Since the suction region S is set at an angle wider than that of the discharge region D in the hydraulic pump P, the suction efficiency into the cylinder bore 8 can be effectively increased even if the back pressure of the pump plunger 9 which is in the suction stroke is far lower than that of the pump plunger 9 which is in the discharge stroke. Consequently, the entire efficiency of the hydraulic pump P can be improved even if the discharge region D is slightly sacrificed.

It should be understood that to enhance such efficiency to the utmost, it is most desirable to set the suction region S at an angle of 180°.

In addition, since the discharge region D is angularly delayed by the angle $\theta_1$ as compared with the case where the line $X_1$ in the eccentric dirction of the first eccentric ring 63 is aligned with the phanton trunnion axis $O_1$, the pump plunger 9 receives a large compression load from the pump swashplate 10 from the instant when it is shrinked at a certain amount past its most projected point. As a result, a largest bending moment produced in the pump plunger 9 is reduced, so that a gouging phenomenon between the pump plunger 9 and the opened edge of the cylinder bore 8 is moderated and thus, a frictional loss due to such phenomenon is significantly reduced.

On the other hand, since the shrinkage region Sh is set at an angle wider than that of the expansion region Ex in the hydraulic motor M, the back pressure of the motor plunger 19 which is in a shrinkage stroke can be reduced sufficiently, and the efficiency of the hydrulic motor M can be totally improved even if the expansion region Ex is slightly sacrificed. D It should be understood that to enhance such efficiency to the utmost, it is most desirable to set the shrinkage region Sh at an angle of 180°.

Additionally, since the expansion region Ex is angularly advanced by the angle $\theta_2$ as compared with the case where the line $X_2$ in the eccentric direction of the second eccentric ring 64 is aligned with the trunnion axis $O_2$, the motor plunger 19 which is in an expansion stroke is early released from a thrust reaction of the motor swashplate 20 before reaching its most projected point. As a result, a largest bending moment produced in the motor plunger 19 is reduced, so that a gouging phenomenon between the motor plunger 19 and the opened edge of the cylinder bore 18 is moderated and thus, a frictional loss due to such phenomenon is reduced significantly.

During such operation, if the second eccentric ring 64 is swung to the clutch OFF position f, the second distributor valve 62 permits the higher pressure outer oil passage 53 to be opened to the outside of the cylinder block B, so that the higher pressure working oil is not supplied to the hydraulic motor M and thus, the transmission of a power is cut off between the hydraulic pump P and the hydraulic motor M. In other words, a so-called clutch OFF condition is provided.

During operation of both the hydraulic pump 10 and the hydraulic motor M, the pump swashplate 10 receives a thrust load from the pump plungers 9, 9 - - -, while the motor swashplate 20 receives a thrust load from the motor plungers 19, 19 - - -, these thrust loads being in the opposite directions. However, the thrust load received by the pump swashplate 10 is supported on the output shaft 31 through thrust roller bearing 11, the pump swashplate holder 12, the thrust roller bearing 40, the support sleeve 37 and the cotter 36, while the thrust load received by the motor swashplate 20 is likewise supported on the output shaft 31 through the thrust roller bearing 21, the trunnion shaft 22, the swashplate anchor 23, the thrust roller bearing 47, the support sleeve 45 and the cotter 44. Therefore, such thrust loads merely produce a tensile stress in the output shaft 31 and would not act on the crank case 4 supporting the shaft 31 at all.

Figure 7:
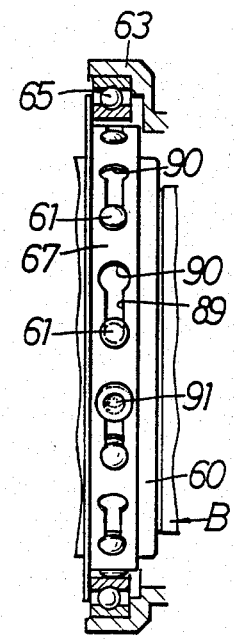

The connecting arrangement for the first distributor valve 61 and the forcing ring 67 is comprised, as shown in FIGS. 6 and 7, of a smaller diameter neck 61b formed on the distributor valve 61 and a circumferential elongated hole 89 made in the forcing ring 67 and adapted to be engaged by the neck 61b, and a larger diameter hole 90 is connected to one end of the elongated hole 89, so that a larger diameter outer end portion of the distributor valve 61 may be inserted through the larger diameter hole 90. Thus, if the distributor valve 61 is inserted into the larger diameter hole 90 with the neck 61b thereof being mated in the elongated hole 89 and then, the forcing ring 67 is rotated circumferentially, the neck 61b can be engaged in the elongated hole 89. To maintain this engagement, a resilient plug 91 is fitted in at least one larger diameter hole 90.

Since the forcing ring 67 is disposed concentrically with the first eccentric ring 63 between the latter and the cylinder block B, each distributor valve 61 can be forced to follow the first eccentric ring 63, performing a given reciprocation. In addition, the forcing ring 67 according to the present invention cannot being about an enlargement in diameter of the cylinder block in contrast to the prior art coiled springs mounted at the central portion of the cylinder block.

The connecting arrangement for the second distributor valve 62 and the forcing ring 68 is similar to the connecting arrangement for the first distributor valve 61 and the forcing ring 67, as shown in FIGS. 11 and 12 and hence, the corresponding parts are designated by the same reference characters and the detailed description thereof is omitted.

Referring to FIGS. 1, 2, 17 and 8, a shift control device 93 for controlling the angle of the motor swashplate 20 is connected to the trunnion shaft 22. The shift control device 93 is constituted of a sector gear 96 secured to the other end of the trunnion shaft 22 by a bolt 94 and a pair of nock pins 95, a worm gear 97 meshed with the sector gear 96, and a reversible D.C. electric motor 99 having a drive shaft 98 connected to the worm gear 97. The worm gear 97 is rotatably supported through bearings 102 and 103 on a gear box 101 secured to the crank case 4 by a bolt 100. The electric motor 99 has a stator fixed in place on the crank case 4.

Thus, the sector gear 96 and the worm gear 97 constitute a decelerator 106 which decelerates and transmits the rotation of the drive shaft 98 to the trunnion shaft 22, but is brought into a locked state upon reception of a reverse load from the trunnion shaft 22.

If the electric motor 99 is rotated in a normal or reverse direction, the rotation thereof can be transmitted in a decelerated manner from the worm gear 97 to the sector gear 96 and further transmitted to the trunnion shaft 22 to rotate the latter in a standing or tilting-down direction.

When the electric motor 99 has been shut off to maintain the motor swashplate 20 at any angle, both of the gears 96 and 97 assume their respective locked states to inhibit the rotation of the trunnion shaft 22 and therefore, the motor swashplate 20 is reliably held in the current position, because the worm gear 97 cannot be driven from the sector gear 96 even if the motor swashplate 20 receives a standing or tilting-down moment from the motor plungers 19, 19 - - -, and this moment is transmitted through the trunnion shaft 22 to the sector gear 96.

To restrict the standing and tilted-down positions of the motor swashplate 20 provided by the electric motor 99, a restricting groove 104 concentric with the sector gear 96 is made in the sector gear 96, and a stopper pin 105 adapted to slidably engage the restricting groove 104 is secured to the gear box 101.

Referring again to FIGS. 1 and 2, a main blind oil passage 108 is provided at a central portion of the output shaft 31, and an oil filter 109 is mounted in the main oil passage 108 over the almost entire length thereof.

The oil filter 109 is cylindrical with one end deeply inserted in the main oil passage 108 being closed and the other end being opened, the opened end being in close contact with an inner peripheral surface at an opened end of the main oil passage 108.

The opened end of the main oil passage 108 is connected to a discharge portion of the supplement pump 38 through an oil passage 130 defined in a side wall of the crank case 4, and an oil filter 131 is also incorporated in the oil passage 130. In addition, an intake portion of the supplement pump 38 is connected to an oil reservoir 110 at the bottom of the crank case 4.

The supplement pump 38 is driven from the drive gear 39 spline-connected to the cylindrical input shaft 5.

Thus, during rotation of the cylindrical input shaft 5, an oil within the oil reservoir 110 is constantly discharged into the oil passage 130 by the supplement pump 38. This oil is first filtered by the oil filter 131; then passed into the main oil passage 108 and filtered by the oil filter 109. Thereafter, the oil is passed through a radial supplement hole or passage 111 perforated in the output shaft 31 into the inner oil passage 52. Therefore, even if foreign matters such as scraps produced at assembling of the transmission T to the crank case 4 enter the main oil passage 108, they can be removed by the oil filter 109, so that a clean working oil may be supplemented into the hydraulic closed circuit between the hydraulic pump P and the hydraulic motor M at all times.

A first check valve 112 for blocking the reverse flow of an oil from the inner oil passage 52 is mounted in the supplement hole 111 and biased in a closing direction by a leaf spring 114 mounted to surround the output shaft 31.

During reverse load operation, i.e., during engine-brake operation, the hydraulic motor M operates to provide a pumping effect, and hydraulic pump P operates to provide a motor effect. Therefore, the pressure in the outer oil passage 53 is changed into a lower level and the pressure in the inner oil passage 52 is changed into a higher level, so that the working oil is intended to reversely flow out of the inner oil passage 52 into the supplement hole 111, but such reverse flow is blocked by the first check valve 112. In this manner, a reverse load is reliably transmitted from the hydraulic motor M to the hydraulic pump P, thus providing a good engine brake effect.

The oil fed into the main oil passage 108 is passed through a pair of radial left and right orifices 115 and 116 provided in the output shaft 31 into lubricating oil passages 117 and 118 which are defined as annular grooves in the outer periphery of the output shaft 31 in a manner to face inner peripheral surfaces of the pump cylinder 9 and the motor cylinder 17. In this case, partitioning tubes 109a and 109b are provided at intermediate portions of the oil filter 109 in contact with an inner peripheral surface of the main oil passage 108 so as to prevent disordered oil flow between the hole 111 and orifices 115, 116.

The oil fed into the right hand lubricating oil passage 117 is introduced into the cylindrical input shaft 5 through an axial oil groove 119 provided in the spline-fitted portion of the output shaft with the cylinder block B. Thus, various portions are lubricated such as the pump swashplate 10 within the cylindrical input shaft 5, the pump plungers 9, the thrust roller bearing 11, the needle bearing 42, the seat plate 33, the aligner 50 and the like.

To further satisfactorily lubricate the thrust roller bearing 11 and the needle bearing 42, a small hole 120 is perforated in the output shaft 31 in communication with the main oil passage 108 in the vicinity of both the bearings 11 and 42.

The oil passed through the lubrication of the needle bearing 42 is then diffused by a centrifugal force to lubricate the thrust roller bearing 40.

The oil fed into the left hand lubricating oil passage 118 is introduced into the swashplate anchor 23 and the cylinder holder 24 through an oil groove 121 provided to traverse the flange 31a of the output shaft 31 against which the end of the motor cylinder 17 abuts, as shown in FIG. 2. Thus, various portions are lubricated such as the motor swashplate 20 within the swashplate anchor 23 and the cylinder holder 24, the motor plungers 19, the thrust roller bearing 21, the trunnion shaft 22, the aligner 51, the needle bearings 25 and 48 and the like.

To provide the further satisfactory lubrication of the needle bearing 48, a small hole 122 is perforated in the output shaft 31 in communication with the main oil passage 108 in the vicinity of that bearing 48.

The oil passed through the lubrication of the needle bearing 48 is then diffused by a centrifugal force to lubricate the thrust roller bearing 47.

Supplementing of the lubricating oil from the main oil passage 108 into the above-described orifices 115 and 116, the small holes 120 and 122 and the like is continued without hindrance even during engine-brake operation.

Figure 15:
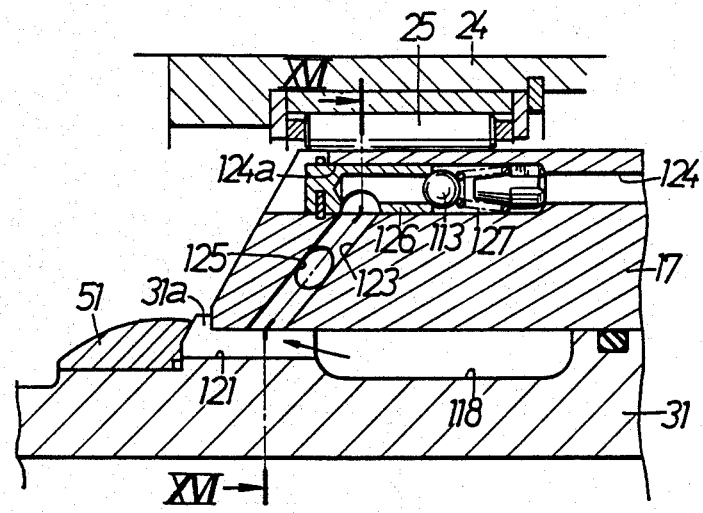
Figure 16:
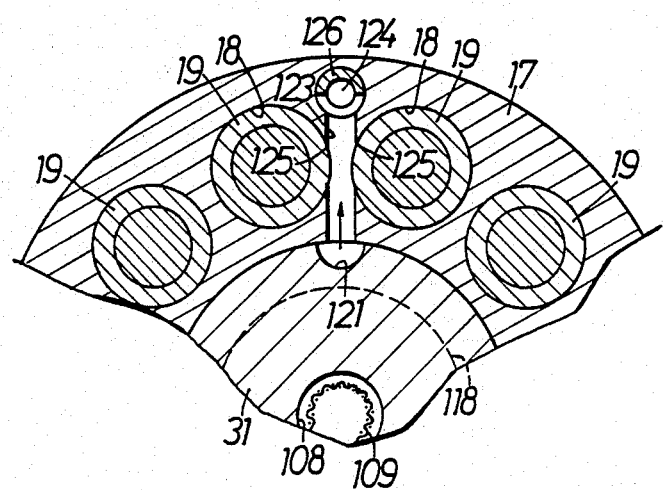
Figure 17:
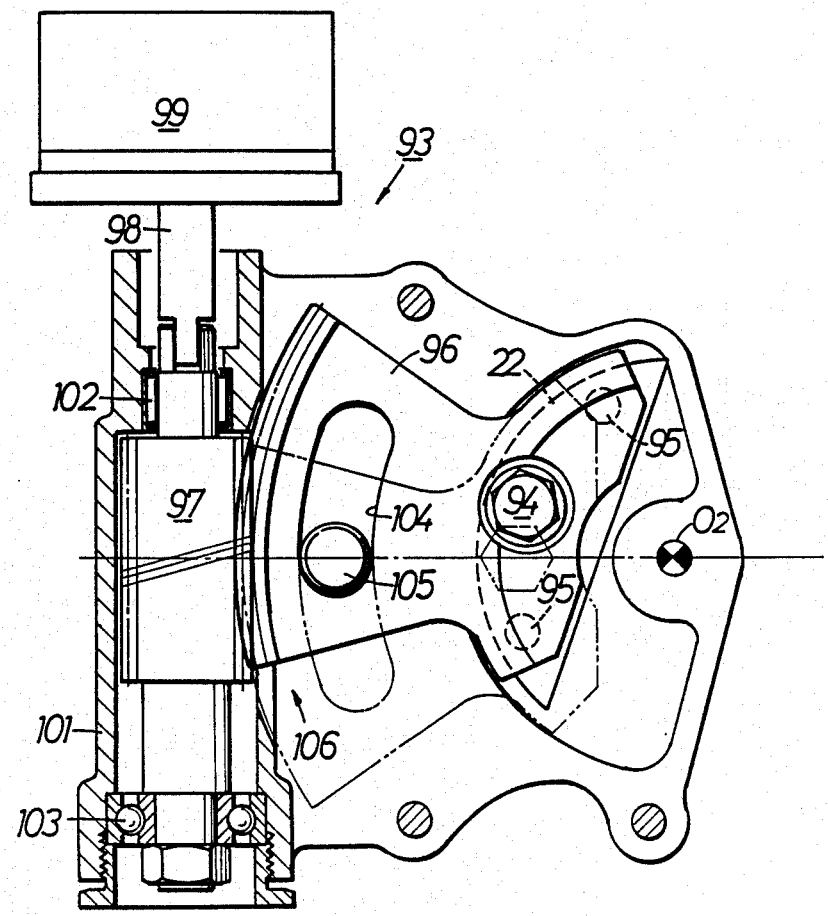

Referring to FIGS. 2, 15 and 16, the motor cylinder 17 is provided with a radial oil passage 123 passed between the two adjacent cylinder bores 18 and 18 at a section always in sliding engagement with the associated motor plunger 19 and connected at its inner end to the oil groove 121, and an axial oil passage 124 permitting the communication of an outer end of the oil passage 123 with the outer oil passage 53.

In this case, the radial oil passage 123 is machined with a drill having a diameter larger than a thickness of a wall between the aforesaid two cylinder bores 18. Therefore, a side hole generally indicated by the reference numeral 125 is made in each of inner walls of the two cylinder bores 18, but is closed by the motor plunger 19 always sliding in the cylinder bore 18 and hence, there is no fear that the working oil in the cylinder bore 18 leaks through the side hole 125.

A second check valve 113 is incorporated in the axial oil passage 124 for blocking the reverse flow of the working oil from the outer oil passage 53. A valve seat 126 cooperating with the second check valve 113 also functions as a plug for closing an opening 124a of the oil passage 124. The check valve 113 is biased toward the valve seat 126 by a spring 127.

Thus, during a normal load operation in which the outer oil passage 53 is at a higher pressure, the second check valve 113 is maintained closed to block flowing of the working oil out of the outer oil passage 53 toward the oil passage 124, while during an engine-brake operation in which the outer oil passage 53 is at a lower pressure, the second check valve 113 is opened in response to leakage of the working oil out of the hydraulic closed circuit, so that the working oil can be supplied from the main oil passage 108 via the oil groove 121 and the oil passages 123, 124 successively into the outer oil passage 53 to make up for oil leakage.

Figure 19:
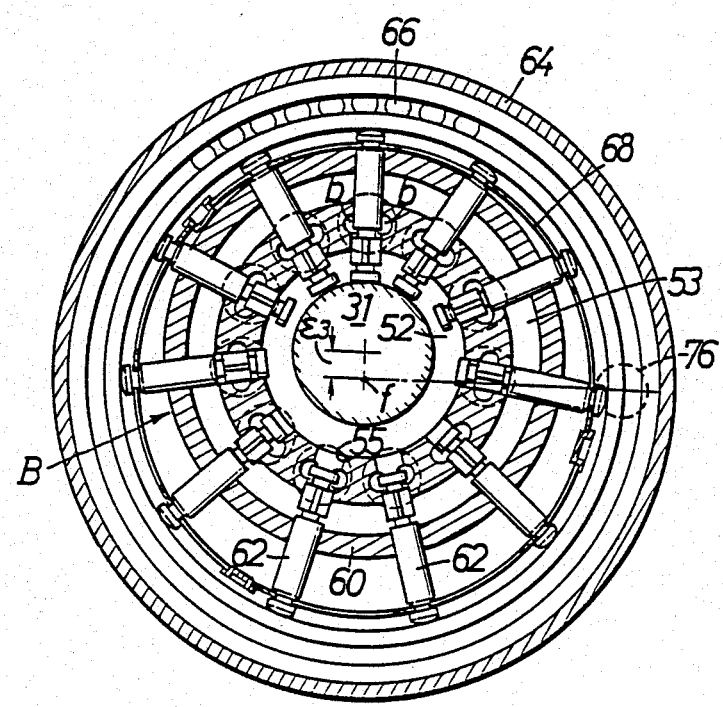
Figure 20:
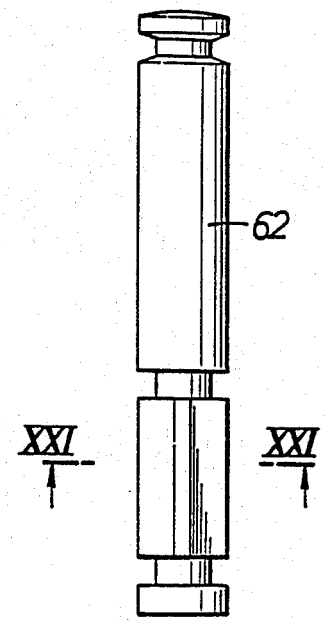
Figure 21:

FIGS. 19 to 21 illustrate another embodiment of the present invention, wherein when the second eccentric ring 64 is operated to the clutch OFF position f, the second distributor valve 62 permits the communication between the outer oil passage 53 and the inner oil passage 52. This also makes it possible to cut off the transmission of a power between the hydraulic pump P and the hydraulic motor M. In these Figures, parts corresponding to those in the previously described embodiment are designated by the same reference characters.

What is claimed is:

1. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, said hydrostatic continuously variable transmission having at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate, wherein said hydrostatic continuously variable transmission has at least one of a relationship that a suction region of said hydraulic pump is set at an angle larger than that of said discharge region thereof and a relationship that a shrinkage region of said hydraulic motor is set at an angle larger than that of said expansion region of said motor.

2. A hydrostatic continuously variable transmission according to claim 1, wherein said pump plungers are slidably received in pump cylinder bores defined in a cylinder block; and further including a cylindrical input shaft rotatably supported on said cylinder block, and a pump swashplate holder phase-adjustably secured to said cylindrical input shaft for supporting a back surface of said pump swashplate.

3. A hydrostatic continuously variable transmission according to claim 2, wherein said pump swashplate holder is spline-secured to said cylindrical input shaft.

4. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, said hydrostatic continuously variable transmission having at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
    wherein said pump plungers and said motor plungers are slidably received in cylinder bores defined in a cylinder block, respectively; and further including a transmission shaft connected to a central portion of said cylinder block, one of said pump swashplate and motor swashplate being supported at its back surface on a flat surface of a trunnion shaft having a semicircular section, said trunnion shaft being rotatably supported at its cylindrical surface, with no clearance, on a swashplate anchor fixedly mounted on a casing, and said swashplate anchor being rotatably supported on said transmission shaft.

5. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, said hydrostatic continuously variable transmission having at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
    wherein one group of said pump plungers and said motor plungers are slidably received in cylinder bores annularly arranged in a cylinder block; and further including concentrically arranged annular higher and lower pressure oil passages provided in said cylinder block and adapted to be alternately brought into communication with each of said cylinder bores by radially reciprocatable distributor valves, and an eccentric ring disposed eccentrically from a rotational center of said cylinder block to abut against outer ends of said distributor valves for providing reciprocal movement to each of said distributor valves with rotation of said cylinder block, one of said pump swashplate and motor swashplate engaged by said one plunger group being supported on a swashplate anchor secured to a casing, said anchor having a cylinder holder connected thereto for rotatably supporting said cylinder block, and said eccentric ring being attached to said cylinder holder.

6. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, said hydrostatic continuously variable transmission having at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
    wherein annularly arranged pump cylinder bores having said pump plungers slidably received therein and annularly arranged motor cylinder bores having said motor plungers slidably received therein are provided in a cylinder block which further includes higher and lower pressure oil passages concentrically provided therein and a large number of distributor valves arranged therein for radial reciprocal movement to bring each of said cylinder bores into alternate communication with said higher and lower pressure oil passages; and further including at least one eccentric ring supported on a support system for at least one of said pump swashplate and said motor swashplate in an eccentric manner with respect to a rotational center of said cylinder block to abut against outer ends of said distributor valves for providing reciprocal movement to each of said distributor valves with rotation of said at least one swashplate relative to the ring, and a forcing ring disposed between said eccentric ring and said cylinder block and connecting said distributor valves to one another in concentrical relation to said eccentric ring.

7. A hydrostatic continuously variable transmission according to claim 6, wherein said distributor valves comprise first distributor valves for controlling the communication between said pump cylinder bores and said higher and lower pressure oil passages, and second distributor valves for controlling the communication between said motor cylinder bores and said higher and lower pressure oil passages, and the forcing ring is individually provided for each group of said first and second distributor valves.

8. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, wherein said hydrostatic continuously variable transmission has at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
further including a pump cylinder in said swashplate type hydraulic pump and a motor cylinder in said swashplate type hydraulic motor, said pump and motor cylinders being integrally coaxially interconnected to form a cylinder block; an inner annular oil passage and an outer annular oil passage surrounding said inner oil passage, both passages being concentrically defined in said cylinder block; a large number of first distributor valves adapted to reciprocally move between radially inner and outer positions in said cylinder block to bring a large number of cylinder bores having said pump plungers slidably received therein into alternate communication with said inner and outer oil passages, respectively and a large number of second distributor valves likewise adapted to reciprocally move between radially inner and outer positions in said cylinder block to bring a large number of cylinder bores having said motor plungers slidably received therein into alternate communication with said inner and outer oil passages, respectively, said first and second distributor valves being radially arranged in said cylinder block; a first eccentric ring mounted to engage said first distributor valves for providing reciprocal movement to each of said distributor valves to bring said cylinder bores in a discharge stroke in said pump cylinder into communication with said outer oil passage and to bring said cylinder bores in a suction stroke into communication with said inner oil passage with relative rotation between said cylinder block and an input member of said hydraulic pump; and a second eccentric ring mounted to engage said second distributor valves for providing reciprocal movement to each of said distributor valves to bring said cylinder bores in an expansion stroke in said motor cylinder into communication with said outer oil passage and to bring said cylinder bores in a shrinkage stroke into communication with said inner oil passage with rotation of said cylinder block, said outer oil passage comprising an annular groove and a large number of recesses provided in a zigzag fashion in opposite side walls of said annular groove, and said first and second distributor valves being arranged to pass through said recesses.

9. A hydrostatic continuously variable transmission according to claim 8, wherein said annular groove is defined into a pigeon's tail configuration in section and has an open end closed by a sleeve secured to an outer peripheral surface of said cylinder block.

10. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, wherein said hydrostatic continuously variable transmission has at least one of a relationship that a middle point of a discharge region of said hydraulic pump is annularly delayed at a given angle in a direction of rotaiton of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
further including a pump cylinder in said swashplate type hydraulic pump and a motor cylinder in said swashplate type hydraulic motor, said pump and motor cylinders being integrally coaxially interconnected to form a cylinder block; an annular higher pressure oil passage connected to cylinder bores in a discharge stroke in said hydraulic pump and an annular lower pressure oil passage connected to cylinder bores in a suction stroke in said hydraulic pump, said oil passages being concentrically defined in said cylinder block; a large number of distributor valves radially arranged for reciprocal movement between radially inner and outer positions in said cylinder block to bring a large number of cylinder bores having the motor plungers of said motor cylinder slidably received therein into alternate communication with said higher pressure oil passage and said lower pressure oil passage; and an eccentric ring supported on a support system for said cylinder block in an eccentric manner with respect to a rotational center of said cylinder block to engage said distributor valves for providing reciprocal movement to each of said distributor valves with rotation of said cylinder block, said eccentric ring being supported for movement between a clutch ON position in which said distributor valves are controlled to bring the cylinder bores of said motor cylinder into alternate communication with said higher pressure oil passage and said lower pressure oil passage and a clutch OFF position in which said distributor valves are controlled to open said higher pressure oil passage to a lower pressure portion.

11. A hydrostatic continuously variable transmission according to claim 10, wherein said lower pressure portion is outside said cylinder block.

12. A hydrostatic continuously variable transmission according to claim 10, wherein said lower pressure portion is the lower pressure oil passage.

13. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, wherein said hydrostatic continuously variable transmission has at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
further including a pump cylinder in said swashplate type hydraulic pump and a motor cylinder in said swashplate type hydraulic motor, said pump and motor cylinders being integrally coaxially interconnected to form a cylinder block; annular lower and higher pressure oil passages concentrically defined in said cylinder block, so that cylinder bores in a suction stroke in said pump cylinder and cylinder bores in a shrinkage stroke in said motor cylinder are brought into communication with said lower pressure oil passage, while cylinder bores in a discharge stroke in said pump cylinder and cylinder bores in an expansion stroke in said motor cylinder are brought into communication with said higher pressure oil passage; and a transmission shaft secured to a central portion of said cylinder block and provided with a main oil passage supplied with an oil from a supplement pump, a supplement hole permitting said main oil passage to communicate with said lower pressure oil passage, and a lubrication hole permitting said main oil passage to communicate with portions to be lubricated of said hydraulic pump and said hydraulic motor, said supplement hole being provided with a check valve for blocking a reverse flow of a working oil from said lower pressure oil passage toward said main oil passage.

14. A hydrostatic continuously variable transmission according to claim 13, wherein said main oil passage is provided to axially extend within said transmission shaft, and said supplement hole and lubrication hole are in communication with said main oil passage at places axially spaced apart from each other.

15. A hydrostatic continuously variable transmission according to claim 13 or 14, wherein a cylindrical oil filter is placed within said main oil passage and internally connected to said supplement pump.

16. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, wherein said hydrostatic continuously variable transmission has at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
further inlcuding a pump cylinder in said swashplate type hydraulic pump and a motor cylinder in said swashplate type hydraulic motor, said pump and motor cylinders being integrally coaxially interconnected to form a cylinder block; annular lower and higher pressure oil passages concentrically defined in said cylinder block, so that cylinder bores in a suction stroke in said pump cylinder and cylinder bores in a shrinkage stroke in said motor cylinder are brought respectively into communication with said lower pressure oil passage, while cylinder bores in a discharge stroke in said pump cylinder and cylinder bores in an expansion stroke in said motor cylinder are brought respectively into communication with said higher pressure oil passage; and a transmission shaft secured to a central portion of said cylinder block and perforated with a main oil passage passing through a central portion of said transmission shaft to lead to a supplement pump, and a supplement hole radially extending from said main oil passage to said lower pressure oil passage, with a cylindrical oil filter being placed in said main oil passage and internally connected to said supplement pump.

17. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between said hydraulic pump and said hydraulic motor, wherein said hydrostatic continuously variable transmission has at least one of a relationship that a middle point of a discharge region of said hydraulic pump is angularly delayed at a given angle in a direction of rotation of said hydraulic pump relative to a tilting axis of the pump swashplate and a relationship that a middle point of an expansion region of said hydraulic motor is angularly advanced at a given angle in a direction of rotation of said hydraulic motor relative to a tilting axis of said motor swashplate,
further including a pump cylinder having cylinder bores in which a large number of the pump plungers of said swashplate type hydraulic pump are slidably received, and a motor cylinder having cylinder bores in which a large number of the motor plungers of said swashplate type hydraulic motor are slidably received, said pump and motor cylinders being coaxially integrally connected to form a cylinder block; an annular inner oil passage and an annular outer oil passage surrounding said inner oil passage, both passages being concentrically defined in said cylinder block, so that cylinder bores in a suction stroke in said pump cylinder and cylinder bores in a shrinkage stroke in said motor cylinder are brought respectively into communication with said lower pressure oil passage, while cylinder bores in a discharge stroke in said pump cylinder and cylinder bores in an expansion stroke in said motor cylinder are brought respectively into communcation with said higher pressure oil passage; a transmission shaft secured to a central portion of said cylinder block and perforated with a main oil passage supplied with an oil from a supplement pump, and a first supplement hole permitting said main oil passage to communicate with said inner oil passage; and a second supplement hole made in said cylinder block to permit said main oil passage to communicate with said outer oil passage, said second supplement hole being formed to pass between adjacent two of the cylinder bores in a section where the associated plungers are always in sliding engagement with the bores and having a diameter larger than a wall thickness of the cylinder block between said adjacent two cylinder bores.

18. A hydrostatic continuously variable transmission according to claim 17, further including a first check valve mounted in said first supplement hole for blocking a reverse flow of a working oil from said inner oil passage toward said main oil passage, and a second check valve mounted in said second supplement hole for blocking a reverse flow of a working oil from said outer oil passage toward said main oil passage.

19. A hydrostatic continuously variable transmission comprising a swashplate type hydraulic pump having a pump swashplate and annularly arranged pump plungers whose suction and discharge strokes are provided by said pump swashplate, a swashplate type hydraulic motor having a motor swashplate and annularly arranged motor plungers whose expansion and shrinkage strokes are provided by said motor swashplate, and a hydraulic closed circuit formed between the hydraulic pump and motor, wherein said hydrostatic continuously variable transmission has at least one of a relationship that a suction region of said hydraulic pump is set at an angle larger than that of a discharge region thereof and a relationship that a shrinkage region of said hydraulic motor is set at an angle larger than that of an expansion region of the motor.

20. A hydrostatic continuously variable transmission according to claim 19 wherein said hydraulic closed circuit includes higher and lower pressure oil passages concentrically disposed; and further including a large number of distributor valves for bringing a large number of cylinder bores having said pump and motor plungers slidably received therein into alternate communication with said higher and lower pressure oil passages by reciprocal movement of the valves between radially inner and outer positions, wherein a moving stroke of each the vlves required to bring said higher pressure oil passage into communication with each of said cylinder bores is set to be larger than that required to bring said lower pressure oil passage into communication with each of said cylinder bores.

21. A hydrostatic continuously variable transmission according to claim 20, wherein each of said distributor valves includes a land slidably received in a valve bore provided over said higher and lower pressure oil passages, said land having a given valve-closing margin provided only at a portion thereof close to said higher pressure oil passage.

22. A hydrostatic continuously variable transmission according to claim 19, wherein said pump plungers are slidably received in pump cylinder bores defined in a cylinder block; and further including a cylindrical input shaft rotatably supported on said cylinder block, and a pump swashplate holder phase-adjustably secured to said cylindrical input shaft for supporting a back surface of said pump swashplate.

23. A hydrostatic continuously variable transmission according to claim 22, wherein said pump swashplate holder is spline-secured to said cylindrical input shaft.

24. A hydrostatic continuously variable transmission according to claim 19, wherein said plungers and said motor plungers are slidably received in cylinder bores defined in a cylinder block, respectively; and further including a transmission shaft connected to a central portion of said cylinder block, one of said pump swashplate and motor swashplate being supported at its back surface on a flat surface of a trunnion shaft having a semicircular section, said trunnion shaft being rotatably supported at its cylindrical surface, with no clearance, on a swashplate anchor fixedly mounted on a casing, and said swashplate anchor being rotatably supported on said transmission shaft.

25. A hydrostatic continuously variable transmission according to claim 19, wherein one group of said pump plungers and said motor plungers are slidably received in cylinder bores annularly arranged in a cylinder block; and further including concentrically arranged annular higher and lower pressure oil passages provided in said cylinder block and adapted to be alternately brought into communication with each of said cylinder bores by radially reciprocatable distributor valves, and an eccentric ring disposed eccentrically from a rotational center of said cylinder block to abut against outer ends of said distributor valves for providing reciprocal movement to each of said distributor valves with rotation of said cylinder block, one of said pump swashplate and motor swashplate engaged by said one group of plungers being supported on a swashplate anchor secured to a casing, said anchor having a cylinder holder connected thereto for rotatably supporting said cylinder block, and said eccentric ring being attached to said cylinder holder.

26. A hydrostatic continuously variable transmission according to claim 19, wherein annularly arranged pump cylinder bores having said pump plungers slidably received therein and annularly arranged motor cylinder bores having said motor plungers slidably received therein are provided in a cylinder block which further includes higher and lower pressure oil passages concentrically provided therein and a large number of distributor valves arranged therein for radial reciprocal movement to bring each of said cylinder bores into alternate communication with said higher and lower pressure oil passages; and further including at least one eccentric ring supported on a support system for at least one of said pump swashplate and said motor swashplate in an eccentric manner with respect to a rotational center of said cylinder block to abut against outer ends of said distributor valves for providing reciprocal movement to each of said distributor valves with rotation of said at least one swashplate relative to the ring, and a forcing ring disposed between said eccentric ring and said cylinder block and connecting said distributor valves to one another in concentric relation to said eccentric ring.

27. A hydrostatic continuously variable transmission according to claim 26, wherein said distributor valves comprise first distributor valves for controlling the communication between said pump cylinder bores and said higher and lower pressure oil passages, and second distributor valves for controlling the communication between said motor cylinder bores and said higher and lower pressure oil passages, and a separate forcing ring is individually provided for each group of said first and second distributor valves.

28. A hydrostatic continuously variable transmission according to claim 19, further including a pump cylinder in said swashplate type hydraulic pump and a motor cylinder in said swashplate type hydraulic motor, said pump and motor cylinders being integrally coaxially interconnected to form a cylinder block; an inner annular oil passage and an outer annular oil passage surrounding said inner oil passage, both passages being concentrically defined in said cylinder block; a large number of first distributor valves adapted to reciprocally move between radially inner and outer positions in said cylinder block to bring a large number of cylinder bores having said pump plungers slidably received therein into alternate communication with said inner and outer oil passages, respectively and a large number of second distributor valves likewise adapted to reciprocally move between radially inner and outer positions in said cylinder block to bring a large number of cylinder bores having said motor plungers slidably received therein into alternate communication with said inner and outer oil passages, respectively, said first and second distributor valves being radially arranged in said cylinder block; a first eccentric ring mounted to engage said first distributor valves for providing reciprocal movement to each of said distributor valves to bring said cylinder bores in a discharge stroke in said pump cylinder into communication with said outer oil passage and to bring said cylinder bores in a suction stroke into communication with said inner oil passage with relative rotation between said cylinder block and an input member of said hydraulic pump; and a second eccentric ring mounted to engage said second distributor valves for providing reciprocal movement to each of said distributor valves to bring said cylinder bores in an expansion stroke in said motor cylinder into communication with said outer oil passage and to bring said cylinder bores in a shrinkage stroke into communication with said inner oil passage with rotation of said cylinder block, said outer oil passage comprising an annular groove and a large number of recesses provided in a zigzag fashion in opposite side walls of said annular groove, and said first and second distributor valves being arranged to pass through said recesses.

29. A hydrostatic continuously variable transmission according to claim 28, wherein said annular groove is defined into a pigeon's tail configuration in section and has an open end closed by a sleeve secured to an outer peripheral surface of said cylinder block.

30. A hydrostatic continuously variable transmission according to claim 19, further including a pump cylinder in said swashplate type hydraulic pump and a motor cylinder in said swashplate type hydraulic motor, said pump and motor cylinders being integrally coaxially interconnected to form a cylinder block; an annular higher pressure oil passage connected to cylinder bores in a discharge stroke in said hydraulic pump, and an annular lower pressure oil passage connected to cylinder bores in a suction stroke in said hydraulic pump, said oil passages being concentrically defined in said cylinder block; a large number of distributor valves radially arranged for reciprocal movement between radially inner and outer positions in said cylinder block to bring a large number of cylinder bores having the motor plungers of said motor cylinder slidably received therein into alternate communication with said higher pressure oil passage and said lower pressure oil passage; and an eccentric ring supported on a support system for said cylinder block in an eccentric manner with respect to a rotational center of said cylinder block to engage said distributor valves for providing reciprocal movement to each of said distributor valves with rotation of said cylinder block, said eccentric ring being supported for movement between a clutch ON position in which said distributor valves are controlled to bring the cylinder bores of said motor cylinder into alternate communication with said higher pressure oil passage and said lower pressure oil passage and a clutch OFF position in which said distributor valves are controlled to open said higher pressure oil passage to a lower pressure portion.

31. A hydrostatic continuously variable transmission according to claim 30, wherein said lower pressure portion is outside said cylinder block.

32. A hydrostatic continuously variable transmission according to claim 30, wherein said lower pressure portion is the lower pressure oil passage.

33. A hydrostatic continuously variable transmission according to claim 19, further including a pump cylinder in said swashplate type hydraulic pump and a motor cylinder in said swashplate type hydraulic motor, said pump and motor cylinders being integrally coaxially interconnected to form a cylinder block; annular lower and higher pressure oil passages concentrically defined in said cylinder block, so that cylinder bores in a suction stroke in said pump cylinder and cylinder bores in a shrinkage stroke in said motor cylinder are brought into communication with said lower pressure oil passage, while cylinder bores in a discharge stroke in said pump cylinder and cylinder bores in an expansion stroke in said motor cylinder are brought into communication with said higher pressure oil passage; and a transmission shaft secured to a central portion of said cylinder block and provided with a main oil passage supplied with an oil from a supplement pump, a supplement hole permitting said main oil passage to communicate with said lower pressure oil passage, and a lubrication hole permitting said main oil passage to communicate with portions to be lubricated of said hydraulic pump and said hydraulic motor, said supplement hole being provided with a check valve for blocking a reverse flow of a working oil from said lower pressure oil passage toward said main oil passage.

34. A hydrostatic continuously variable transmission according to claim 33, wherein said main oil passage is provided to axially extend within said transmission shaft, and said supplement hole and lubrication hole are in communication with said main oil passage at places axially spaced apart from each other.

35. A hydrostatic continuously variable transmission according to claim 33 or 34, wherein a cylindrical oil filter is placed within said main oil passage and internally connected to said supplement pump.

36. A hydrostatic continuously variable transmission according to claim 19, further including a pump cylinder in said swashplate type hydraulic pump and a motor cylinder in said swashplate type hydraulic motor, said pump and motor cylinders being integrally coaxially interconnected to form a cylinder block; annular lower and higher pressure oil passages concentrically defined in said cylinder block, so that cylinder bores in a suction stroke in said pump cylinder and cylinder bores in a shrinkage stroke in said motor cylinder are brought respectively into communication with said lower pressure oil passage, while cylinder bores in a discharge stroke in said pump cylinder and cylinder bores in an expansion stroke in said motor cylinder are brought respectively into communication with said higher pressure oil passage; and a transmission shaft secured to a central portion of said cylinder block and perforated with a main oil passage passing through a central portion of said transmission shaft to lead to a supplement pump, and a supplement hole radially extending from said main oil passage to said lower pressure oil passage, with a cylindrical oil filter being placed in said main oil passage and internally connected to said supplement pump.

37. A hydrostatic continuously variable transmission according to claim 19, further including a pump cylinder having cylinder bores in which a large number of the pump plungers of said swashplate type hydraulic pump are slidably received, and a motor cylinder having cylinder bores in which a large number of the motor plungers of said swashplate type hydraulic motor are slidably received, said pump and motor cylinders being coaxially integrally connected to form a cylinder block; an annular inner oil passage and an annular outer oil passage surrounding said inner oil passage, both passages being concentrically defined in said cylinder block, so that cylinder bores in a suction stroke in said pump cylinder and cylinder bores in a shrinkage stroke in said motor cylinder are brought respectively into communication with said lower pressure oil passage, while cylinder bores in a discharge stroke in said pump cylinder and cylinder bores in an expansion stroke in said motor cylinder are brought respectively into communication with said higher pressure oil passage; a transmission shaft secured to a central portion of said cylinder block and perforated with a main oil passage supplied with an oil from a supplement pump, and a first supplement hole permitting said main oil passage to communicate with said inner oil passage; and a second supplement hole made in said cylinder block to permit said main oil passage to communicate with said outer oil passage, said second supplement hole being formed to pass between adjacent two of the cylinder bores in a section where the associated plungers are always in sliding engagement with the bores and having a diameter larger than a wall thickness of the cylinder block between said adjacent two cylinder bores.

38. A hydrostatic continuously variable transmission according to claim 37, further including a first check valve mounted in said first supplement hole for blocking a reverse flow of a working oil from said inner oil passage toward said main oil passage, and a second check valve mounted in said second supplement hole for blocking a reverse flow of a working oil from said outer oil passage toward said main oil passage.

39. A hydrostatic continuously variable transmission according to claim 19, wherein when one of said pump plungers assumes a position most projected from a pump cylinder bore associated therewith, said pump cylinder bore is located in said suction region and when one of said motor plungers assumes a position most projected from a motor cylinder bore associated therewith, said motor cylinder bore is located in said shrinkage region.

40. A hydrostatic continuously variable transmission according to claim 39, wherein said hydrostatic continuously variable transmission has at least one of a relationship that a middle point of said discharge region of said hydraulic pump is angularly delayed at a given angle in a direction of rotaiton of said hydraulic pump relative to a tilting axis of the pump swashplate and a relationship that a middle point of said expansion region of said hydraulic motor is angularly advanced at a given angle in a direction of rotation of said hydraulic motor relative to a tilting axis of said motor swashplate.

* * * * *

UNITED STATES PATENT AND TRADEMARK OFFICE
CERTIFICATE OF CORRECTION

PATENT NO. : 4,827,721

DATED : May 9, 1989

INVENTOR(S) : Hayashi et al.

It is certified that error appears in the above-identified patent and that said Letters Patent is hereby corrected as shown below:

In claim 7 (column 17, line 16), delete "the" and insert therefor -- a separate --.

In claim 13 (column 19, line 22), delete "annularly" and insert therefor -- angularly --.

In claim 20 (column 21, line 61), delete "vlves" and insert therefor -- valves --.

In claim 24 (column 22, line 17) after said (first occurrence), insert -- pump --.

In claim 40 (column 26, line 36), delete "rotaiton" and insert therefor -- rotation --.

Signed and Sealed this

Twenty-sixth Day of June, 1990

Attest:

HARRY F. MANBECK, JR.

*Attesting Officer*     *Commissioner of Patents and Trademarks*